United States Patent
Kim et al.

(10) Patent No.: US 9,411,200 B2
(45) Date of Patent: Aug. 9, 2016

(54) LIQUID CRYSTAL DISPLAY

(71) Applicant: Samsung Display Co., Ltd., Yongin, Gyeonggi-Do (KR)

(72) Inventors: Yu Jin Kim, Hwaseong-si (KR); Seon Uk Lee, Seongnam-si (KR); Tae Woo Lim, Hwaseong-si (KR); Don Chan Cho, Seongnam-si (KR); Kyung Tae Chae, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 130 days.

(21) Appl. No.: 14/292,268

(22) Filed: May 30, 2014

(65) Prior Publication Data
US 2015/0002801 A1 Jan. 1, 2015

(30) Foreign Application Priority Data
Jun. 28, 2013 (KR) .................. 10-2013-0075354

(51) Int. Cl.
| | |
|---|---|
| *G02F 1/1335* | (2006.01) |
| *G02F 1/1343* | (2006.01) |
| *G02F 1/1341* | (2006.01) |
| *G02F 1/1333* | (2006.01) |

(52) U.S. Cl.
CPC ........ *G02F 1/134309* (2013.01); *G02F 1/1341* (2013.01); *G02F 1/133528* (2013.01); *G02F 1/133536* (2013.01); *G02F 2001/133388* (2013.01)

(58) Field of Classification Search
CPC ................................................. G02F 1/33536
See application file for complete search history.

(56) References Cited

U.S. PATENT DOCUMENTS

| | | | |
|---|---|---|---|
| 2004/0239840 A1 | 12/2004 | Ikeda et al. | |
| 2005/0078240 A1* | 4/2005 | Murade | G02F 1/136209 349/110 |
| 2012/0062448 A1 | 3/2012 | Kim et al. | |
| 2013/0083268 A1* | 4/2013 | Hirabayashi | G03B 21/16 349/58 |
| 2014/0203301 A1 | 7/2014 | Kim et al. | |

FOREIGN PATENT DOCUMENTS

| | | |
|---|---|---|
| JP | 2002-357799 | 12/2002 |
| KR | 10-2009-0077280 | 7/2009 |
| KR | 10-2012-0026880 | 3/2012 |
| KR | 10-2013-0042307 A | 4/2013 |

OTHER PUBLICATIONS

European Search Report corresponding to European Patent Application No. 14173755.1, 9 pages.

* cited by examiner

*Primary Examiner* — Phu Vu
(74) *Attorney, Agent, or Firm* — Innovation Counsel LLP

(57) ABSTRACT

The present invention relates to a liquid crystal display including: an insulating substrate; and a plurality of pixels arranged in a matrix shape over the insulating substrate. The pixels include a display pixel disposed in a display region and a dummy pixel disposed in a dummy region, the dummy region is disposed outside the display region, and the display pixel includes a liquid crystal layer injected into a microcavity.

15 Claims, 14 Drawing Sheets

FIG. 12

| Decrease in thickness of sacrifice layer of outermost pixel | | | |
|---|---|---|---|
| 1st Pixel | 2nd Pixel | 3rd Pixel | 4th Pixel |
| -0.27 | -0.07 | -0.02 | Planarized |
| Spec out | Spec in | | |

FIG. 13

| Decrease in thickness of roof layer of outermost | | | | | | | | | |
|---|---|---|---|---|---|---|---|---|---|
| 1st Pixel | 2nd Pixel | 3rd Pixel | 4th Pixel | 5th Pixel | 6th Pixel | 7th Pixel | 8th Pixel | 9th Pixel | 10th Pixel |
| -0.86 | -0.36 | -0.31 | -0.28 | -0.20 | -0.17 | -0.13 | -0.11 | -0.02 | Planarized |
| Spec out | Spec in | | | | | | | | |

FIG. 16

| (Measurement average of 8 pixels per device) | Primary level difference | BM extension | Organic layer | Bottom level difference (measured value) | Outermost pixel drooping |
|---|---|---|---|---|---|
| ① 2.5" COA organic layer included | CF/BM | Not included | Included | 8μm | -1.28μm |
| ② 15.5" COA organic layer not included | CF/BM | 9mm Included | Not included | 4μm | -0.87μm |
| ③ 15.5" COA organic layer included | CF/BM | 9mm Included | Included | 3.5μm | -0.81μm |
| ④ 2.5" EM organic layer not included | - | - | - | 3.0μm | -0.79μm |

# LIQUID CRYSTAL DISPLAY

CROSS-REFERENCE TO RELATED APPLICATION

This application claims priority to and the benefit of Korean Patent Application No. 10-2013-0075354 filed in the Korean Intellectual Property Office on Jun. 28, 2013, the entire contents of which are incorporated herein by reference.

BACKGROUND (a) Field

Embodiments of the present invention relate to a liquid crystal display, and more particularly, to a liquid crystal display having a liquid crystal layer in a microcavity.

(b) Description of the Related Art

A liquid crystal display is one of flat panel displays which are widely used at the moment, and includes two display panels and a liquid crystal layer interposed therebetween. The display panels include field generating electrodes such as a pixel electrode and a common electrode.

The liquid crystal display applies a voltage to the field generating electrode to generate an electric field in the liquid crystal layer. Through the electric field, the liquid crystal display sets the orientation of liquid crystal molecules of the liquid crystal layer, and controls polarization of incident light to display an image.

A liquid crystal display having an embedded microcavity (EM) structure is manufactured by the following process: a photo resist sacrificial layer is formed, a support member is applied thereon, the sacrificial layer is then removed, and liquid crystal is filled in an empty space formed by removing the sacrificial layer.

In order to control the liquid crystal, an alignment layer is formed in the empty space (microcavity) formed by removing the sacrificial layer.

The above information disclosed in this Background section is only for enhancement of understanding of the background of the invention and therefore it may contain information that does not form the prior art.

SUMMARY

Embodiments of the present invention have been made in an effort to provide a liquid crystal display in which the height of a microcavity of a pixel to display an image is maintained at a predetermined level.

An exemplary embodiment of the present invention provides a liquid crystal display including: an insulating substrate; and a plurality of pixels arranged in a matrix shape over the insulating substrate. The pixels include a display pixel disposed in a display region and a dummy pixel disposed in a dummy region, the dummy region is disposed outside the display region, and the display pixel includes a liquid crystal layer injected into a microcavity.

The dummy region may include at least one of a horizontal dummy region disposed at the top and bottom sides of the display region, a vertical dummy region disposed at the left and right side of the display region, and a corner dummy region disposed at a corner of the display region.

The horizontal dummy region may include a plurality of dummy pixels arranged in one row, and the vertical dummy region may include a plurality of dummy pixels arranged in one column.

The horizontal dummy region may include one row of dummy pixels, and the vertical dummy region may include one column of dummy pixels.

The corner dummy region may be formed at a position where the horizontal dummy region and the vertical dummy region are extended to meet each other.

The display pixel may include: a thin film transistor; a pixel electrode connected to the thin film transistor and disposed under the microcavity; and a common electrode disposed over the microcavity.

The dummy pixel may not include at least one of the thin film transistor, the pixel electrode, and the common electrode, which are included in the display pixel.

The display pixel and the dummy pixel may have a liquid crystal injection hole for injecting a liquid crystal material into the microcavity.

The dummy pixel may further include a sacrificial layer disposed over the pixel electrode or the thin film transistor and made of an organic material such as photoresist.

The display pixel and the dummy pixel may further include a color filter disposed between the thin film transistor and the pixel electrode.

The display pixel and the dummy pixel may further include a black matrix disposed between the thin film transistor and the pixel electrode.

The black matrix may further include an extension facing a peripheral portion, and the extension may be disposed only over the dummy pixel.

The display pixel may further include a roof layer covering the common electrode and the liquid crystal layer injected into the microcavity.

The dummy pixel may not include at least one of the thin film transistor, the pixel electrode, the common electrode, and the roof layer, which are included in the display pixel.

The dummy pixel may further include a sacrificial layer disposed over the pixel electrode or the thin film transistor and made of an organic material such as photoresist.

The sacrificial layer of the dummy pixel may be exposed because the dummy pixel does not include the roof layer.

In the liquid crystal display including the liquid crystal layer formed in the microcavity without an upper insulating substrate, dummy pixels are formed at one or more of the outermost sides thereof such that the height of the microcavity in the display pixel for displaying an image is maintained at a predetermined level, which makes it possible to prevent the degradation of display quality.

BRIEF DESCRIPTION OF THE DRAWINGS

FIGS. 12 and 13 are tables showing the characteristic of the peripheral portion of the liquid crystal display according to the embodiment of the present invention.

FIG. 16 is a table showing characteristics of peripheral portions of liquid crystal displays according to various embodiments of the present invention.

DETAILED DESCRIPTION OF THE EMBODIMENTS

Figure 1:
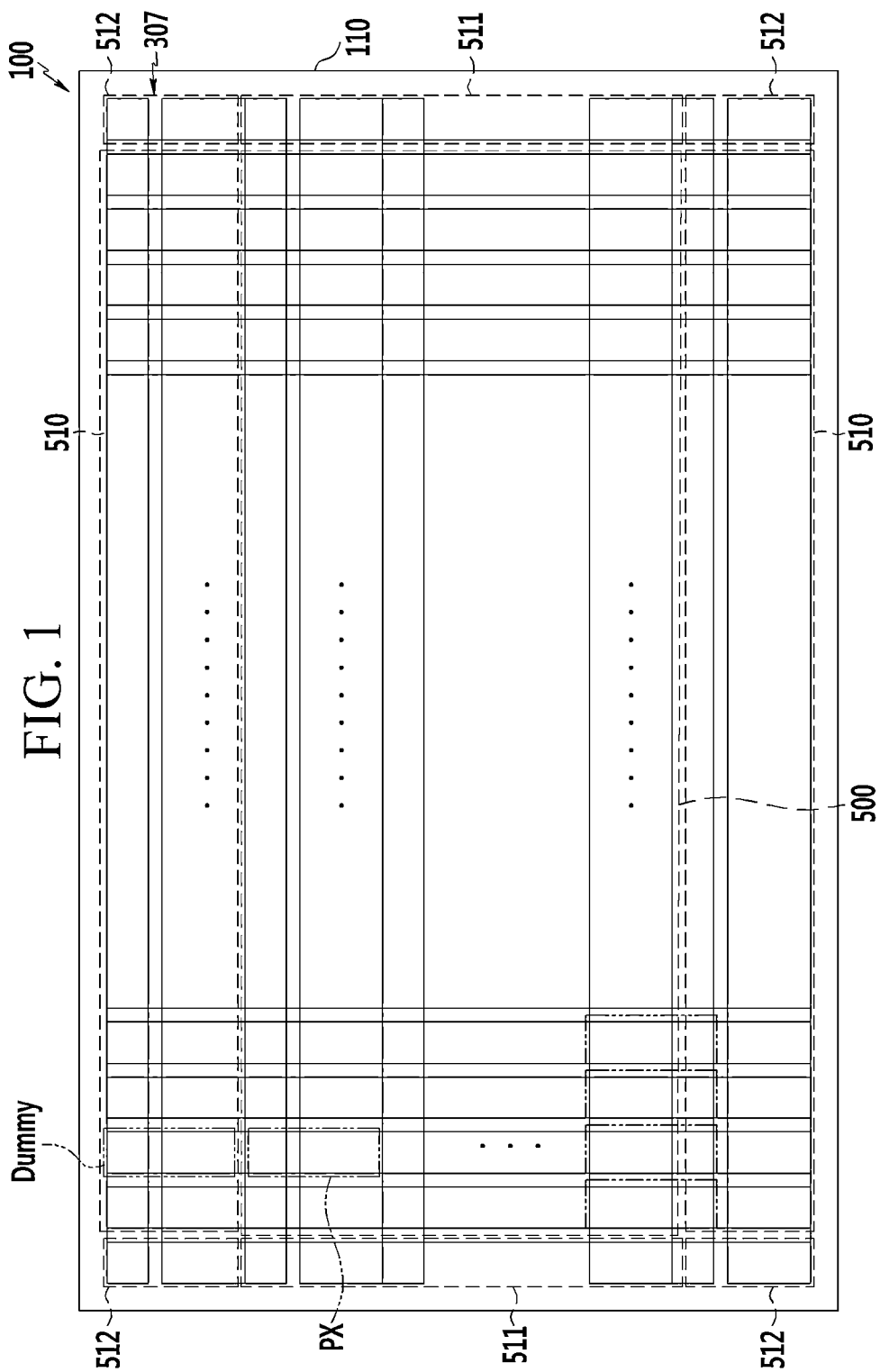
FIG. 1 is a layout view of an entire liquid crystal display according to an exemplary embodiment of the present invention.

Embodiments of the present invention will be described more fully hereinafter with reference to the accompanying drawings, in which exemplary embodiments of the invention are shown. As those skilled in the art would realize, the described embodiments may be modified in various different ways without departing from the spirit or scope of the present invention.

In the drawings, the thickness of layers, films, panels, regions, etc., may have been exaggerated for clarity. Like reference numerals designate like elements throughout the specification. It will be understood that when an element such as a layer, film, region, or substrate is referred to as being "on" another element, it can be formed directly on the other element or formed on the other element with one or more intervening elements. In contrast, when an element is referred to as being "directly on" another element, there are no intervening elements present.

Hereinafter, a liquid crystal display according to an exemplary embodiment of the present invention will be described in detail with reference to the drawings.

FIG. 1 is a layout view of an entire liquid crystal display according to an exemplary embodiment of the present invention. The liquid crystal display 100 includes a plurality of pixels arranged in a matrix shape over one insulating substrate 110.

One pixel is divided into upper and lower parts based on a liquid crystal injection hole 307, and the upper and lower parts constitute one pixel.

The pixels are classified into display pixels PX which display an image and dummy pixels which do not display an image. The display pixels PX are disposed in a display region 500, and the dummy pixels are disposed at one or more of the outsides of the display region 500.

In the exemplary embodiment of FIG. 1, the dummy pixels are formed on all the sides of the display region 500 to surround the display region 500, but may be formed only on one side of the display region 500.

The dummy pixels are disposed in dummy regions 510, 511, and 512 which surround the display region 500. The dummy regions 510, 511, and 512 include a horizontal dummy region 510 disposed at the top or bottom side of the display region 500, a vertical dummy region 511 disposed at the left or right side of the display region 500, and a corner dummy region 512 disposed at a corner of the display region 500. The horizontal dummy region 510 may be disposed at the top and bottom sides of the display region 500, the vertical dummy region 512 may be disposed at the left and right sides of the display region and the corner dummy region 512 may be disposed at each corner of the display region 500. All the dummy regions 510, 511, and 512 may be formed on the liquid crystal display 100. Only one or some of the dummy regions 510, 511, and 512 may be formed on the liquid crystal display 100.

The horizontal dummy region 510 may include a plurality of dummy pixels arranged in at least one row, and the vertical dummy region 511 may include a plurality of dummy pixels arranged in at least one column.

In the exemplary embodiment of FIG. 1, the horizontal dummy region 510 includes one row of dummy pixels, and the vertical dummy region 511 includes one column of dummy pixels.

The corner dummy region 512 is formed at a position where an imaginary extension of the horizontal dummy region 510 and an imaginary extension of the vertical dummy region 511 meet each other.

The display pixel PX includes a thin film transistor, a pixel electrode, a common electrode, and a liquid crystal layer disposed in a microcavity disposed between the pixel electrode and the common electrode. The thin film transistor is formed over the insulating substrate 110, and has terminals connected to a gate line and a data line which cross each other with an intervening insulating layer therebetween. The other terminal of the thin film transistor is connected to the pixel electrode. A color filter and a black matrix may be disposed between the thin film transistor and the pixel electrode. The black matrix may also be disposed between adjacent pixels. Furthermore, the display pixel may include a roof layer to cover the liquid crystal layer injected into the microcavity. The color filter and the black matrix may be formed under the pixel electrode and over the thin film transistor. The structure of the display pixel PX will be described in detail with reference to FIGS. 2 to 4.

Since the dummy pixel does not display an image, the structure of the dummy pixel may have a variety of embodiments. That is, the dummy pixel may not include one or more of the thin film transistor, the pixel electrode, the common electrode, the microcavity, and the liquid crystal layer disposed in the microcavity.

For example, the dummy pixel may include a thin film transistor and a pixel electrode. Depending on exemplary embodiments, the dummy pixel may include a color filter or black matrix. The color filter or black matrix may be disposed between the thin film transistor and the pixel electrode. The sacrificial layer over the pixel electrode may not be removed in the dummy pixel. Depending on exemplary embodiments, the sacrificial layer may be removed to form a microcavity in the dummy pixel. The microcavity for the dummy pixel may have a smaller height than that of the microcavity of the display pixel PX. Thus, when the liquid crystal layer is disposed in the microcavity in the dummy pixel, the microcavity may not have a sufficient cell gap.

In the exemplary embodiment of FIG. 1, each of the dummy regions 510, 511, and 512 are formed outside the display region 500 to surround the display region 500, and includes one row or column of dummy pixels. Depending on exemplary embodiments, however, the dummy region may include two or more rows or columns of dummy pixels. Forming dummy pixels or not depends on a height of the microcavity. When the microcavity has enough heights to form appropriate pixels, there may be no need to form the microcavity. However, when the microcavity does not have enough heights, the dummy pixels may be formed outside the display region 500.

According to the exemplary embodiment of FIG. 1, the display pixel PX and the dummy pixel include a liquid crystal injection hole 307 for injecting a liquid crystal material into a microcavity. However, the liquid crystal injection hole may not be formed in the dummy pixel.

The color filter and the black matrix may be disposed under the pixel electrode and over the thin film transistor. The dummy pixel may have the same layer structure as the display pixel PX. However, one or more elements of the display pixel PX may be omitted in the dummy pixel because the dummy pixel does not display an image. The display pixel PX includes a microcavity formed by removing a sacrificial layer, but the dummy pixel may have a sacrificial layer without removing the sacrificial layer.

When the liquid crystal display includes the liquid crystal layer injected into the microcavity, the liquid crystal display may remove a top insulating substrate. Thus a thin liquid crystal display may be obtained.

Hereafter, the structure of the display pixel PX according to the exemplary embodiment of the present invention will be described in detail with reference to FIGS. 2 to 4.

Figure 2:
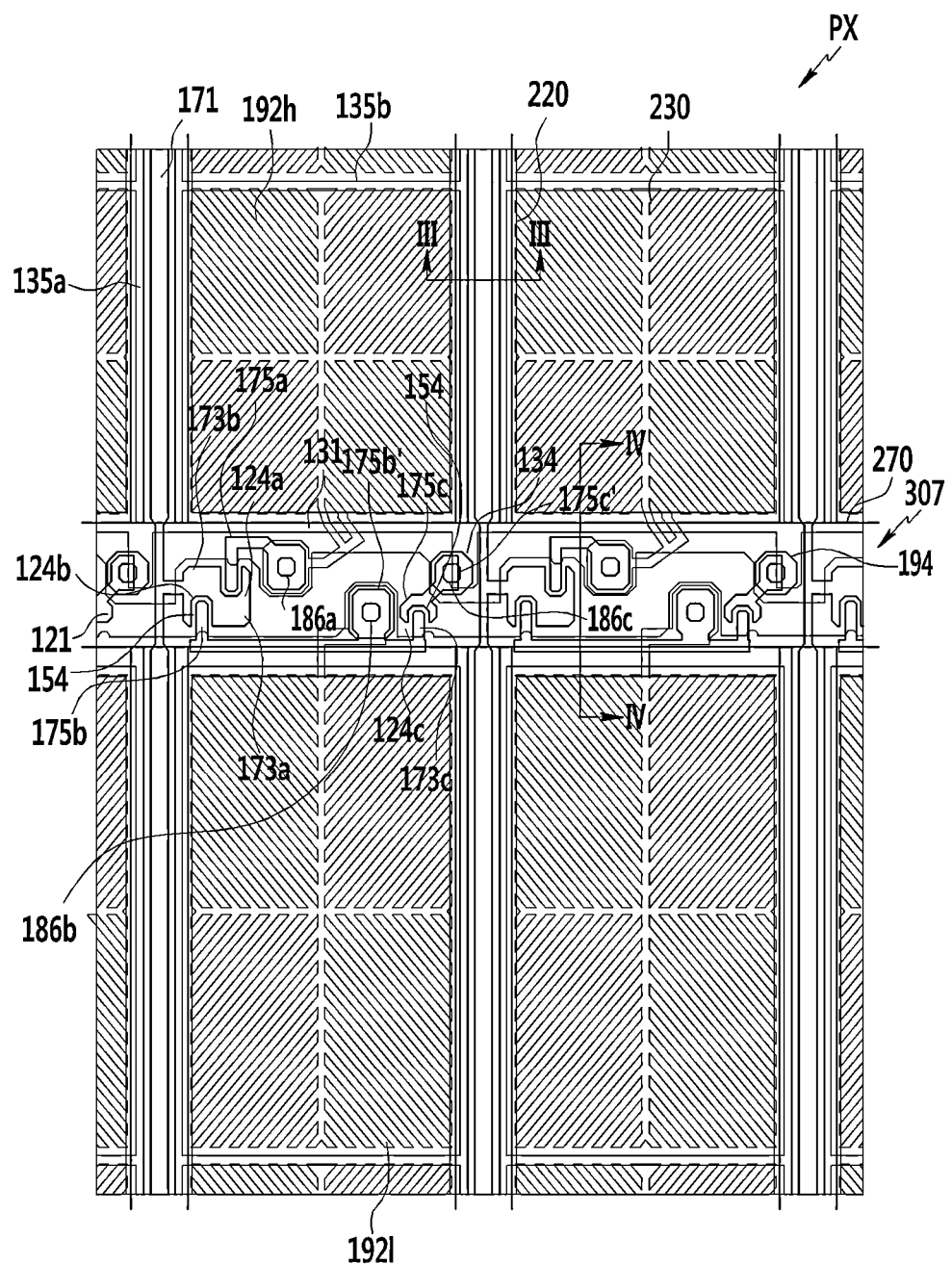
FIG. 2 is a detailed layout view of a pixel in the liquid crystal display according to the exemplary embodiment of the present invention.
Figure 3:
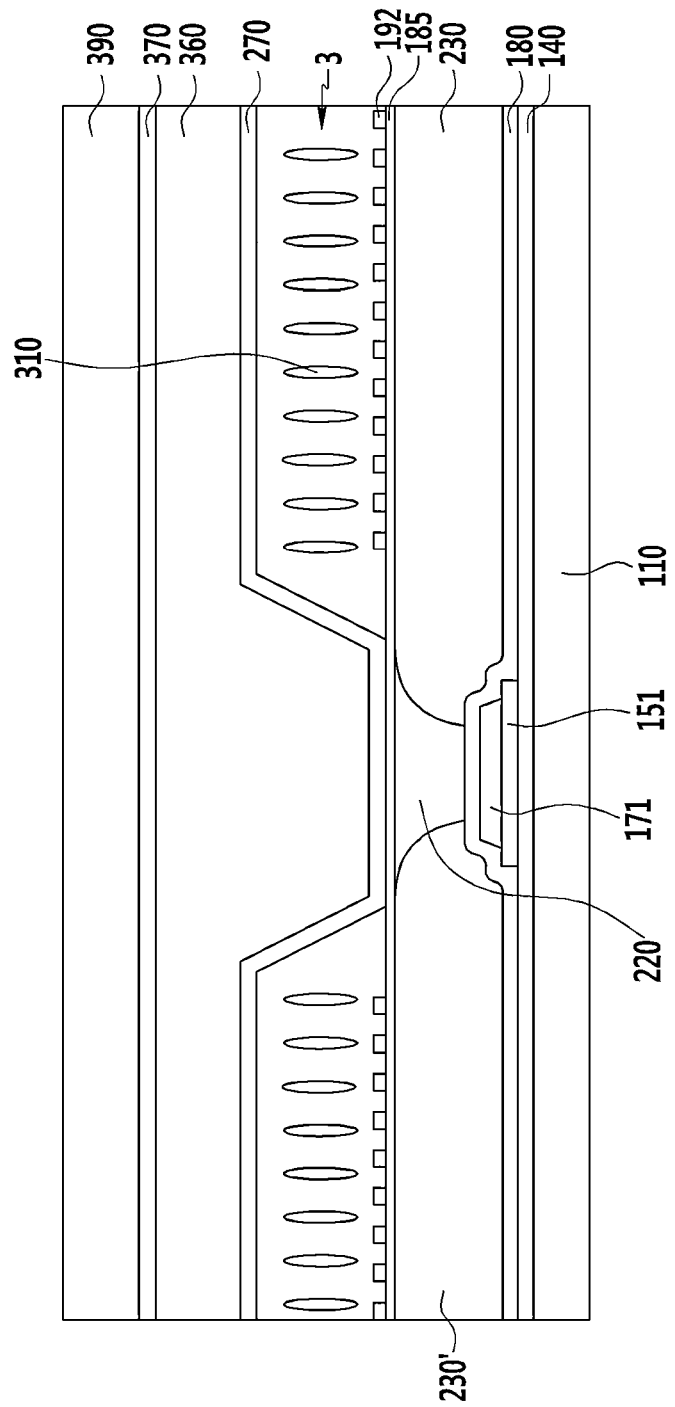
FIG. 3 is a cross-sectional view taken along line III-III of FIG. 2.
Figure 4:
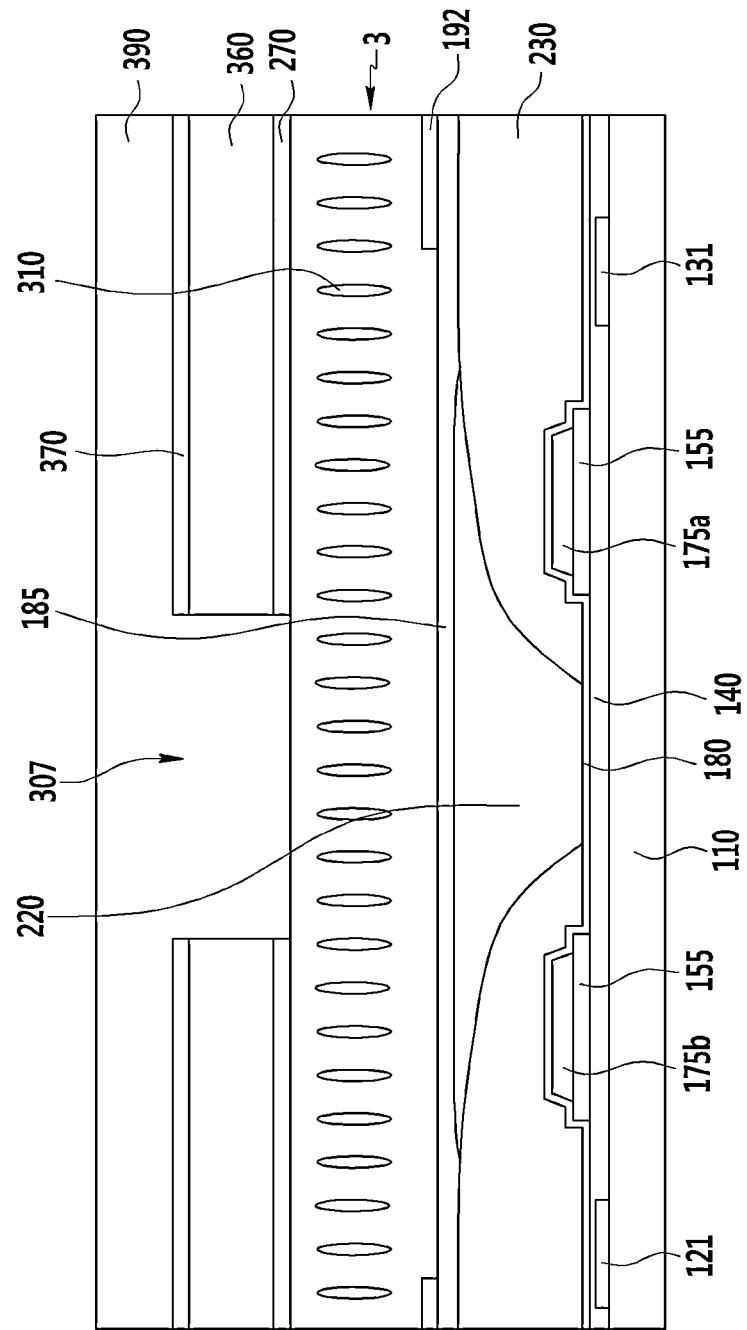
FIG. 4 is a cross-sectional view taken along line IV-IV of FIG. 2.

FIG. 2 is a detailed layout view of a pixel in the liquid crystal display according to the exemplary embodiment of the present invention, FIG. 3 is a cross-sectional view taken along line III-III of FIG. 2, and FIG. 4 is a cross-sectional view taken along line IV-IV of FIG. 2.

A gate line 121 and a sustain voltage line 131 are formed over the insulating substrate 110 made of transparent glass or plastic. The gate line 121 includes a first gate electrode 124a, a second gate electrode 124b, and a third gate electrode 124c. The sustain voltage line 131 includes a sustain electrode 135a and 135b and a protrusion 134 protruding toward the gate line 121. The sustain electrode 135a and 135b has a structure which surrounds a first sub-pixel electrode 192h and a second sub-pixel electrode 192l of a previous pixel. The horizontal portion 135b of the sustain electrode of FIG. 2 may correspond to one wiring which is not separated from a horizontal portion 135b of a sustain electrode in the previous pixel.

A gate dielectric layer 140 is formed over the gate line 121 and the sustain voltage line 131. A semiconductor 151 disposed under a data line 171, a semiconductor 155 disposed under a source/drain electrode, and a semiconductor 154 disposed at a channel of the thin film transistor are formed over the gate dielectric layer 140.

A plurality of ohmic contacts (not shown) may be formed over the respective semiconductors 151, 154, and 155 and between the data line 171 and the source/drain electrode.

A plurality of data conductors 171, 173c, 175a, 175b, and 175c are formed over the respective semiconductors 151, 154, and 155, and the gate dielectric layer 140. The plurality of data conductors 171, 173c, 175a, 175b, and 175c includes a plurality of data lines 171 including first and second source electrodes 173a and 173b, a first drain electrode 175a, a second drain electrode 175b, a third source electrode 173c, and a third drain electrode 175c.

The first gate electrode 124a, the first source electrode 173a, the first drain electrode 175a, and the semiconductor 154 form a first thin film transistor Qa, and a channel of the thin film transistor is formed at the semiconductor 154 between the first source electrode 173a and the first drain electrode 175a. Similarly, the second gate electrode 124b, the second source electrode 173b, the second drain electrode 175b, and the semiconductor 154 form a second thin film transistor Qb, and a channel of the thin film transistor is formed at the semiconductor 154 between the second source electrode 173b and the second drain electrode 175b. The third gate electrode 124c, the third source electrode 173c, the third drain electrode 175c, and the semiconductor 154 form a third thin film transistor Qc, and a channel of the thin film transistor is formed at the semiconductor 154 between the third source electrode 173c and the third drain electrode 175c.

The data line 171 according to the embodiment of the present invention has a structure in which the width decreases in a thin film transistor formation region around an extension 175c' of the third drain electrode 175c. The structure serves to maintain a distance from an adjacent wiring and reduce signal interference. However, the structure is not limited thereto.

A first passivation layer 180 is formed over the data conductors 171, 173c, 175a, 175b, and 175c, and the exposed semiconductor 154. The first passivation layer 180 may include an inorganic insulator, such as silicon nitride (SiNx), silicon oxide (SiOx), or silicon oxynitride (SiOxNy), or an organic insulator.

A color filter 230 is formed over the passivation layer 180. Pixels in the same column may include color filters 230 having the same color. However, the color of the color filters 230 in the same column may include different colors. Furthermore, pixels adjacent in the horizontal direction (gate line direction) include color filters 230 and 230' having different colors, and the two color filters 230 and 230' may overlap each other over the data line 171. Each of the color filters 230 and 230' may display one of the three primary colors of red, green, and blue. However, the color filter is not limited to the three primary colors of red, green, and blue, but may display one of cyan, magenta, yellow, and white-based color.

A black matrix 220 is formed over the color filters 230 and 230'. The black matrix 220 may be formed around a region where an image is displayed, and may be formed on a region where the gate line 121, the sustain voltage line 131, and the thin film transistor are formed (hereafter, referred to as 'transistor formation region') and a region where the data line 171 is formed. The black matrix 220 may have a lattice structure having an opening corresponding to a region for displaying an image. The color filter 230 is formed in the opening of the black matrix 220. The black matrix 220 is formed of a material through which light cannot be transmitted.

A second passivation layer 185 is formed over the color filter 230 and the black matrix 220 so as to cover the color filter 230 and the black matrix 220. The second passivation layer 185 may include an inorganic insulator, such as silicon nitride (SiNx), silicon oxide (SiOx), or silicon oxynitride (SiOxNy), or an organic insulator. When an undulation is formed due to a thickness difference between the color filter 230 and the black matrix 220 unlike the structure illustrated in FIGS. 2 and 3, the second passivation layer 185 may be formed of an organic insulator to reduce or remove the undulation.

The color filter 230, the black matrix 220, and the passivation layers 180 and 185 have first and second contact holes 186a and 186b formed to expose the first drain electrode 175a and the extension 175b' of the second drain electrode 175b, respectively. Furthermore, the color filter 230, the black matrix 220, and the passivation layers 180 and 185 have a third contact hole 186c formed to expose the protrusion 134 of the sustain voltage line 131 and the extension 175c' of the third drain electrode 175c.

In the present exemplary embodiment, the black matrix 220 and the color filter 230 also have the contact holes 186a, 186b, and 186c formed therein. However, depending on the materials of the black matrix 220 and the color filter 230, an etching process for forming the contact holes of the black matrix 220 and the color filter 230 may be more difficult to perform than an etching process for forming the contact holes of the passivation layer 180 and 185. Thus, when the black matrix 220 or color filter 230 is etched, the black matrix 220 or the color filter 230 may be previously removed from the positions where the contact holes 186a, 186b, and 186c are formed.

Depending on exemplary embodiments, the position of the black matrix 220 may be changed to etch only the color filter 230 and the passivation layers 180 and 185, thereby forming the contact holes 186a, 186b, and 186c.

A pixel electrode 192 including the first sub-pixel electrode 192h and the second sub-pixel electrode 192l is formed over the second passivation layer. The pixel electrode 192 may be made of a transparent conductive material such as ITO or IZO.

The first sub-pixel electrode 192h and the second sub-pixel electrode 192l are adjacent to each other in the column direction, have a rectangular shape as a whole, and include a cross-shaped trunk portion including a horizontal trunk portion and a vertical trunk portion crossing the horizontal trunk portion. Each of the first and second sub-pixel electrodes 192h and 192l is divided into four sub-regions by the horizontal trunk portion and the vertical trunk portion, and each of the sub-regions includes a plurality of micro trunk portions.

The micro trunk portions of the first and second sub-pixel electrodes 192h and 192l form an angle of 40 to 45 degrees with the gate line 121 or the horizontal trunk portion. The micro trunk portions of two sub-regions adjacent to each other may cross at right angles. The width of the micro trunk portions may gradually increase, or the distances between the respective micro trunk portions may differ from each other.

The first and second sub-pixel electrodes 192h and 192l are physically and electrically connected to the first and second drain electrodes 175a and 175b through the contact holes 186a and 186b, and receive a data voltage from the first and second drain electrodes 175a and 175b, respectively.

A connecting member 194 electrically connects the extension 175c' of the third drain electrode 175c and the protrusion 134 of the sustain voltage line 131 through the third contact hole 186c. As a result, a part of the data voltage applied to the second drain electrode 175b is divided through the third source electrode 173c. Thus, a voltage applied to the second sub-pixel electrode 192l may be lower than a voltage applied to the first sub-pixel electrode 192h.

The area of the second sub-pixel electrode 192l may be equal to or larger than that of the first sub-pixel electrode 192h and equal to or smaller than that of two times of the first sub-pixel electrode 192h.

The second passivation layer 185 may have an opening capable of removing gas emitted from the color filter 230 and a cover made of the same material as the pixel electrode 192 and covering the opening. The cover is formed to prevent gas emitted from the color filter 230 from being transferred to other elements, and may be omitted.

A lower alignment layer (not shown) is formed over the second passivation layer 185 and the pixel electrode 192.

A microcavity is disposed over the pixel electrode 192 and the lower alignment layer, and a liquid crystal layer 3 is formed in the microcavity.

The top surface of the microcavity has a horizontal plane, and the side surfaces of the microcavity have a tapered structure. As a result, the top surface of the liquid crystal layer 3 of each display pixel PX has a horizontal plane, and the side surfaces of the liquid crystal layer 3 have a tapered structure. An upper alignment layer (not illustrated) is disposed on the top and side surfaces of the microcavity.

An upper part and the lower part of the microcavity are separated from each other by a liquid crystal injection hole formation region which includes a liquid crystal injection hole. The liquid crystal injection hole formation region 307 is formed along a direction parallel to the gate line 121. The common electrode extends along the same direction as the liquid crystal injection hole formation region 307.

The liquid crystal layer 3 to be formed in the microcavity may be injected into the microcavity through a capillary force.

The common electrode 270 is disposed over the microcavity, that is, over the liquid crystal layer 3. The common electrode 270 is formed along the top and side surfaces of the liquid crystal layer 3. The common electrode 270 may be separated at the liquid crystal injection hole formation region 307. Thus, a plurality of common electrode stripes may be formed. The plurality of common electrodes 270 are formed at predetermined intervals from each other. The liquid crystal injection hole formation region 307 is formed in a direction parallel to the gate line 121, and thus the extension direction of the common electrode 270 coincides with the extension direction of the gate line 121.

The common electrode 270 is made of a transparent conductive material such as ITO or IZO, and serves to generate an electric field with the pixel electrode 192 and control the arrangement direction of the liquid crystal molecules 310.

A support member is formed over the common electrode 270. The support member according to the exemplary embodiment of the present invention includes a roof layer 360 and an upper insulating layer 370. Depending on exemplary embodiments, the upper insulating layer 370 may be omitted. Depending on exemplary embodiments, a lower insulating layer made of the same material as the upper insulating layer 370 may be formed under the roof layer 360. The lower insulating layer and the upper insulating layer 370 may serve to protect the roof layer 360.

The roof layer 360 is formed over the common electrode 270. The roof layer 360 may serve to support the common electrode 270 such that a microcavity is formed between the pixel electrode 192 and the common electrode 270. The roof layer 360 includes a pillar portion disposed between the adjacent microcavities. The liquid crystal layer 3 and the microcavity are supported and maintained by the pillar portion of the roof layer 360. The roof layer 360 may be made of photoresist or various organic materials.

The upper insulating layer 370 is formed over the roof layer 360. The upper insulating layer 370 may include an inorganic insulator such as silicon nitride (SiNx), silicon oxide (SiOx), or silicon oxynitride (SiOxNy).

The roof layer 360 and the upper insulating layer 370 may have the liquid crystal injection hole at one side thereof such that liquid crystal is injected into the microcavity via the liquid crystal injection hole. The liquid crystal injection hole formation region 307 includes a liquid crystal injection hole connected to each microcavity. The liquid crystal injection hole corresponds to an entrance through which liquid crystal is injected into the microcavity. The liquid crystal injection hole formation region 307 and the liquid crystal injection hole may also be used when the sacrificial layer for forming the microcavity is removed.

A capping layer 390 is formed over the upper insulating layer 370 so as to seal the liquid crystal injection hole. The capping layer 390 blocks the liquid crystal injection hole formation region 307, and prevents the liquid crystal molecules 310 from leaking to the outside. As illustrated in FIGS. 3 and 4, the capping layer 390 may be formed across the entire region of the liquid crystal display. Depending on exemplary embodiments, the capping layer 390 may be formed only at the top of the liquid crystal injection hole formation region 307 and around the liquid crystal injection hole formation region 307. The top surface of the capping layer 390 may have a planar surface like the bottom surface of the insulating substrate 110.

A polarizing plate (not illustrated) is disposed under the insulating substrate 110 and over the capping layer 390. The polarizing plate may include a polarization element for generating polarization of light and a TAC (Tri-acetyl-cellulose) layer for securing durability. Depending on exemplary embodiments, the polarizer may include upper and lower polarizing plates of which transmission axes are perpendicular or parallel to each other.

In FIGS. 3 and 4, a portion represented as the liquid crystal layer 3 is where the sacrificial layer had been disposed during a manufacturing process. As the sacrificial layer is removed, the microcavity is formed, and a liquid crystal material is injected into the microcavity so as to form the liquid crystal layer 3.

As such, the sacrificial layer is not remained in the display pixel PX after finishing the manufacturing process, because the sacrificial layer is removed during the manufacturing process. However, the sacrificial layer may remain in the dummy pixel.

Hereinafter, the dummy pixel disposed at the peripheral portion of the liquid crystal panel will be described with reference to FIGS. 5 to 10.

First, referring to FIGS. 5 and 6, the layer structure of the dummy pixel will be described briefly.

Figure 5:
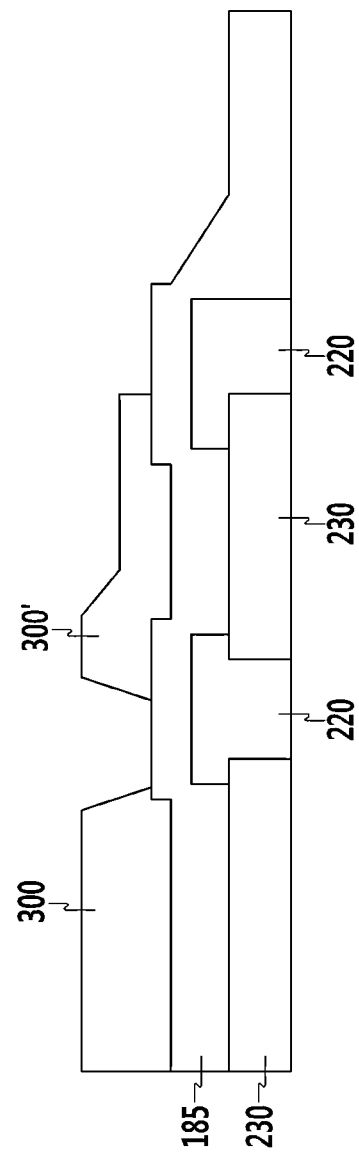
FIGS. 5 and 6 are cross-sectional views of a peripheral portion of the liquid crystal display according to the exemplary embodiment of the present invention.
Figure 6:
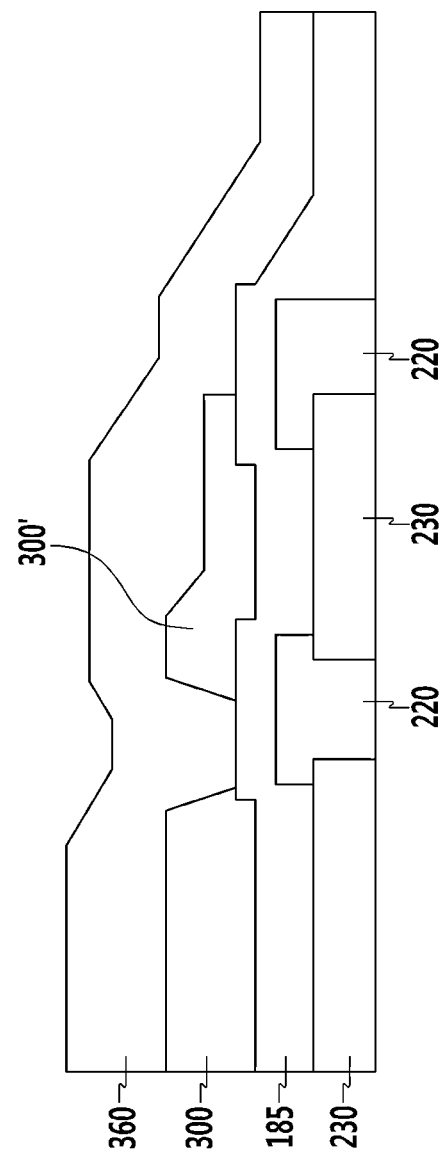

FIGS. 5 and 6 are cross-sectional views of the peripheral portion of the liquid crystal display according to the exemplary embodiment of the present invention.

In FIGS. 5 and 6, the structures under the color filter 230 and the black matrix 220 are omitted. FIGS. 5 and 6 are cross-sectional views illustrating a manufacturing process of the dummy pixel.

FIG. 5 is a cross-sectional view of the peripheral portion of the liquid crystal display in the case where the sacrificial layer is already formed.

The second passivation layer 185 is formed over the color filter 230 and the black matrix 220 so as to cover the cover filter 230 and the black matrix 220. The pixel electrode 192 is formed over the second passivation layer 185. In FIG. 5, however, the pixel electrode 192 is omitted.

The sacrificial layer is formed over the pixel electrode. The sacrificial layer formed in the display pixel PX 300 is formed with a predetermined thickness. The thickness of the sacrificial layer may be determined according to the cell gap of the pixel. However, the sacrificial layer formed in the dummy pixel 300' may have a thickness different from the predetermined thickness. The thickness of the sacrificial layer in the dummy pixel may be lower than that of the sacrificial layer in the display pixel. The sacrificial layers 300 and 300' are made of an organic material such as photoresist. Since the color filter 230 or the black matrix 220 disposed under the sacrificial layer may have a relatively small thickness at the peripheral portion, the sacrificial layer 300' formed over the color filter 230 or the black matrix 220 at the peripheral portion may have small thickness compared to the sacrificial layer 300 formed over the color filter 230 or the black matrix 220 at the display pixel portion because the sacrificial layer formed on edges of the substrate can be easily removed from the substrate during the formation of the sacrificial layer.

After the process of FIG. 5, the roof layer 360 is formed as illustrated in FIG. 6. In the display pixel PX, the roof layer 360 is formed to maintain a constant thickness and height. In the dummy pixel, however, since the roof layer 360 is formed over the thin sacrificial layer 300', the thickness of the roof layer 360 may decrease too. FIG. 6 illustrates a structure in which the thickness of the roof layer 360 is decreased at the peripheral portion.

In the case of the liquid crystal display in which the color filter 230 and the black matrix 220 are formed at the bottom of the liquid crystal display and the liquid crystal layer 3 is formed in the microcavity, the thickness of the sacrificial layer may decrease at the peripheral portion, and more than on pixels having a sacrificial layer which does not have a thickness corresponding to a predetermined value may be formed. In this case, one or more dummy pixels may be used.

Referring to the cross-sectional views of FIGS. 5 and 6, the dummy pixel may include the following components.

The dummy pixel includes a thin film transistor connected to a gate line (dummy gate line) and a data line (dummy data line), a first passivation layer 180 covering the thin film transistor, a color filter 230 and a black matrix 220 formed over the first passivation layer, a second passivation layer 185 covering the color filter 230 and the black matrix 220, a pixel electrode disposed over the second passivation layer 185, a sacrificial layer 300' disposed over the pixel electrode, and the roof layer 360 disposed over the sacrificial layer 300'. A part of the components may be omitted in FIGS. 5 and 6. Depending on exemplary embodiments, however, the dummy pixel may have a different structure. The dummy pixel may further include a common electrode 270, and the upper insulating layer 370 may be formed over the roof layer 360. Depending on exemplary embodiments, the sacrificial layer 300' may be removed, and the liquid crystal layer 3 may be injected into a microcavity formed by removing the sacrificial layer 300'. However, the liquid crystal layer 3 may be covered so as not to display an image.

Hereinafter, the characteristics of an actually-manufactured liquid crystal display will be described with reference to FIGS. 7 to 10.

FIGS. 7 to 10 illustrate the characteristics of the peripheral portion of the liquid crystal display according to the exemplary embodiment of the present invention.

Figure 7:
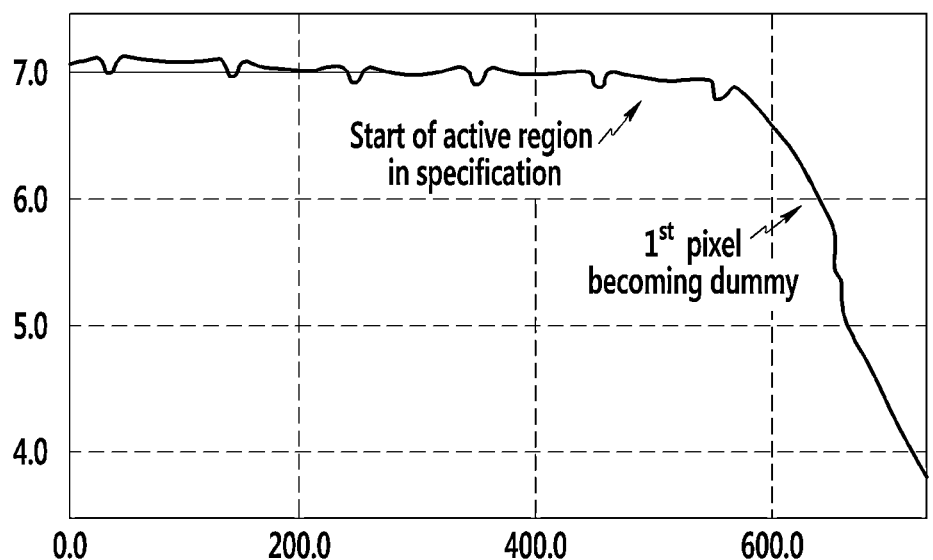
FIGS. 7 to 10 illustrate the characteristics of the peripheral portion of the liquid crystal display according to the exemplary embodiment of the present invention.

FIG. 7 is a graph illustrating a result obtained by measuring the height of the peripheral portion of the liquid crystal display in a state where the roof layer 360 is formed. In FIG. 7, the unit of the graph is μm.

As illustrated in FIG. 7, the height of the roof layer 360 is constantly maintained in the display pixel PX, but rapidly decreases at the peripheral portion of the liquid crystal display. This occurs due to a decreasing in thicknesses of the layers underlying the sacrificial layer such as the color filter 230, or the black matrix 220 under the roof layer 360. Thus, a dummy pixel may be formed at the portion where the roof layer 360 does not maintain a predetermined height in order to display an image normally.

Figure 8:
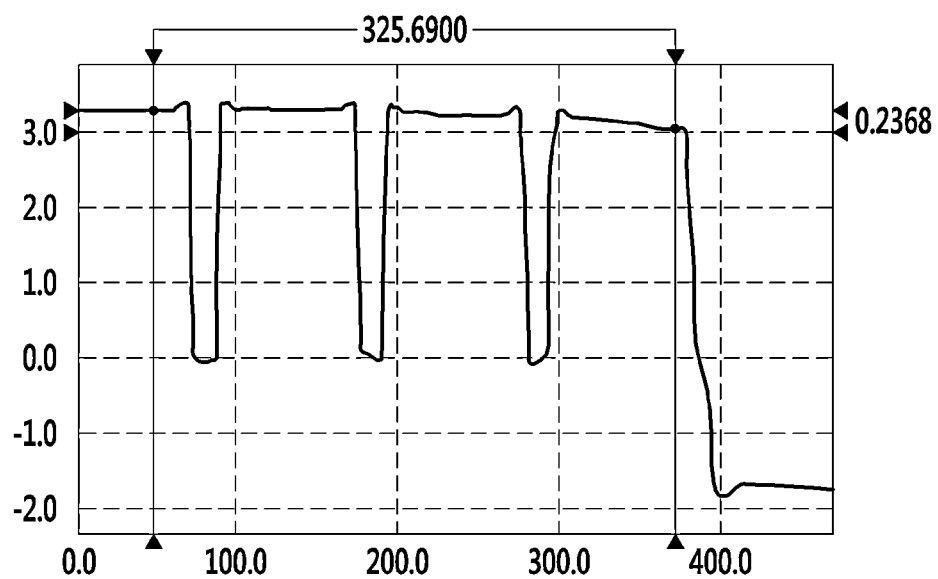

FIG. 8 is a graph illustrating a result obtained by measuring the height of the peripheral portion of the liquid crystal display in a state where the sacrificial layers 300 and 300' are formed. In FIG. 8, the unit of the graph is μm.

The sacrificial layers 300 of the display pixel PX is formed with a predetermined thickness and at a predetermined interval from each other. However, the sacrificial layer 300' disposed at the peripheral portion does not maintain a required height, because the thickness of the sacrificial layer 300' decreases toward at the peripheral portion. Thus, the corresponding portion cannot be used as a display pixel PX. A dummy pixel is formed at the portion in which the sacrificial layer does not have the predetermined thickness.

FIG. 8 illustrates that the thickness of the sacrificial layer 300' of the dummy pixel decreases by 0.2368 μm. The decrease of the thickness of the sacrificial layer may cause deterioration in quality of the image displayed in the display device. Thus, the corresponding portion cannot be used as a display pixel PX. Although the thickness of the sacrificial layer decreases, a thickness corresponding to a predetermined value or less may be allowed when the thickness falls within the range of the predetermined thickness allowance. However, when the thickness of the sacrificial layer deviates from the range of the predetermined thickness allowance, a dummy pixel is required. The specification may be changed depending on the size of the pixel, and the size and resolution of the liquid crystal display.

Figure 9:
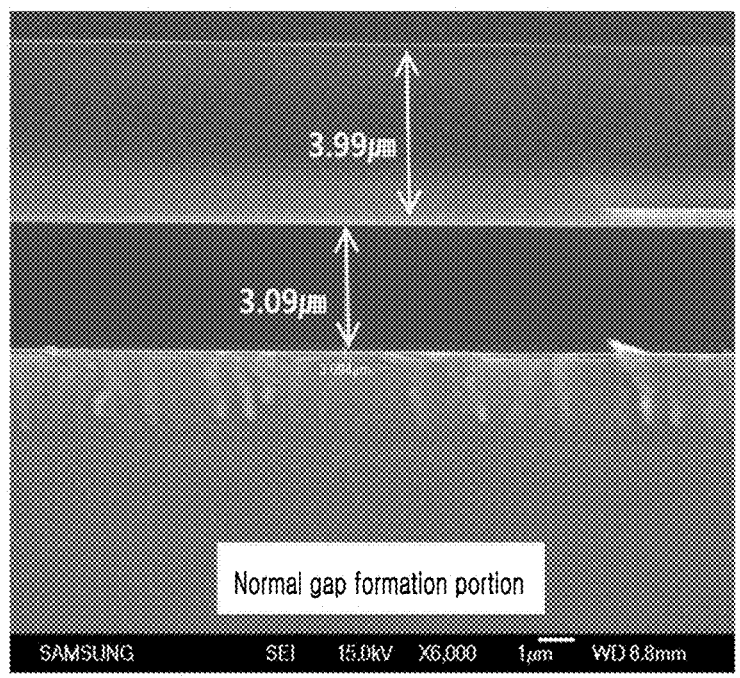
Figure 10:
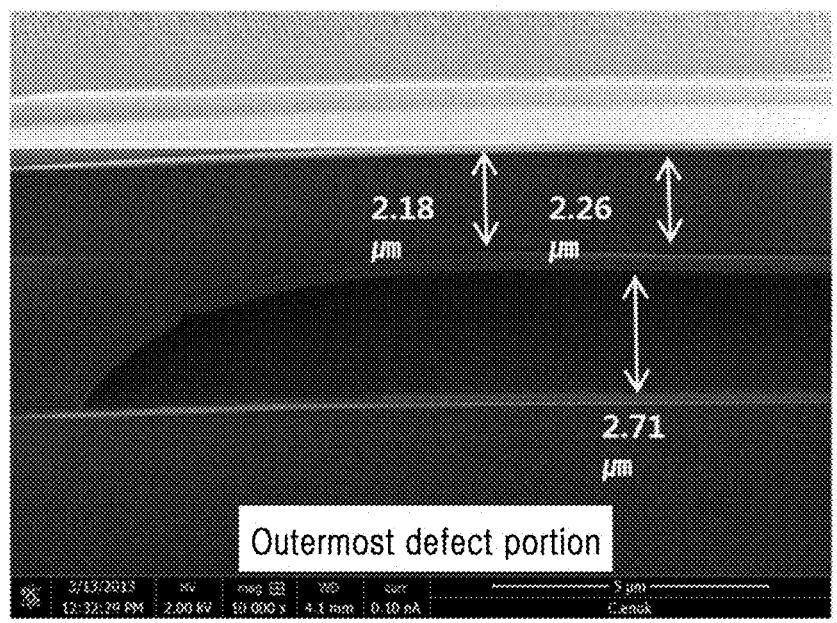

FIGS. 9 and 10 are cross-sectional photographs illustrating that the sacrificial layer and the roof layer have a thickness difference in a display pixel PX and a dummy pixel.

FIG. 9 is a cross-sectional photograph of the display pixel PX. Referring to FIG. 9, it can be seen that the sacrificial layer 300 has a thickness of 3.09 μm and the roof layer 360 has a thickness of 3.99 μm, which indicates that the sacrificial layer 300 and the roof layer 360 satisfy the specification and have a predetermined thickness.

On the other hand, FIG. 10 is a cross-sectional photograph of the dummy pixel at the peripheral portion. Referring to FIG. 10, it can be seen that the sacrificial layer 300' has a thickness of 2.71 μm which is much smaller than in the display pixel PX, and the thickness of the roof layer 360 decreases from 2.26 μm to 2.18 μm at the peripheral portion.

When two pixels having different characteristics as illustrated in FIGS. 9 and 10 are used as display pixels in one liquid crystal display, the display quality may be degraded because the pixels have different display characteristics. Thus, a liquid crystal display having a liquid crystal layer injected into a microcavity may require one or more dummy pixel regions, and each of the dummy pixel regions may include one or more rows or columns of dummy pixels. The number of dummy pixels included in the dummy pixel region may be changed according to the specification.

Hereinafter, the characteristic of a sacrificial layer in a liquid crystal display in which a color filter 230 and a black matrix 220 are not formed under a microcavity will be described with reference to FIG. 11.

Figure 11:
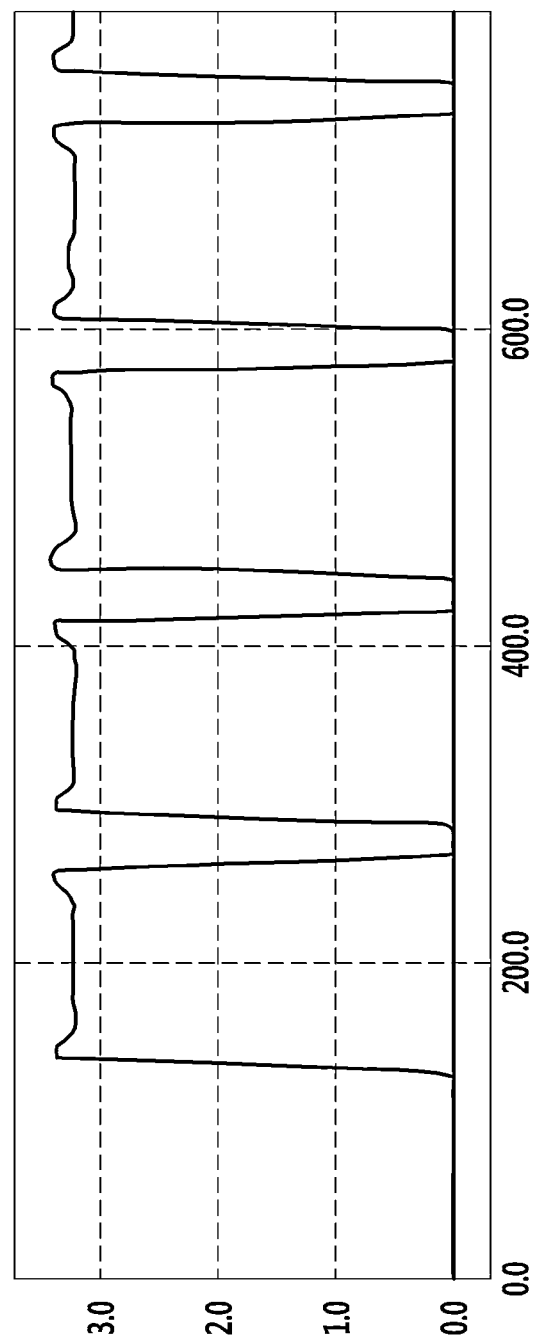
FIG. 11 is a graph illustrating the characteristic of a sacrificial layer at a peripheral portion of a liquid crystal display according to another embodiment of the present invention.

FIG. 11 is a graph illustrating the characteristic of a sacrificial layer at a peripheral portion of a liquid crystal display according to another embodiment of the present invention. In FIG. 11, the unit of the graph is μm.

Referring to FIG. 11, it can be seen that the thickness of the sacrificial layer 300 does not decrease, but is constantly maintained.

As known from the result of FIG. 11, when no color filters or black matrix is formed under the microcavity (or the sacrificial layer), a dummy pixel may not be required. The dummy pixel may be formed in the case when the sacrificial layer has a thickness different from the predetermined thickness.

Hereinafter, referring to FIGS. 12 and 13, the thickness of a sacrificial layer and a roof layer in each pixel will be examined on the basis of specification according to an exemplary embodiment of the present invention, when a color filter or black matrix is formed under a microcavity (or sacrificial layer).

FIGS. 12 and 13 are tables showing the characteristic of the peripheral portion of the liquid crystal display according to the embodiment of the present invention.

FIG. 12 shows the thickness of sacrificial layers, which is smaller than the thickness of a planarized sacrificial layer, and the thickness are represented by μm.

Only a first pixel disposed at the outermost portion has the thickness of the sacrificial layer thinner than the specification by 0.27 μm, which indicates that only the first pixel is out of a specification limit. The thicknesses of the sacrificial layers of second and third pixels have a thickness of the sacrificial layer thinner than the specification. However, the thicknesses of the sacrificial layers of the second and the third pixels are still within the specification limit. Thus, only the pixel disposed at the outermost portion may be used as a dummy pixel, and the other pixels may be used as display pixels PX so as to display an image.

FIG. 13 shows the thickness of roof layers, which are smaller than the thickness of a planarized roof layer, and the thickness are represented by μm.

A first pixel is disposed at the outermost portion and the thickness of a roof layer of the first pixel decreases by 0.86 μm, which indicates that the first pixel is out of a specification limit. The thicknesses of the sacrificial layers of second to ninth pixels have a thickness of the sacrificial layer thinner than the specification. However, the thicknesses of the sacrificial layers of the second to the ninth pixels are still within the specification limit. Thus, only the pixel disposed at the outermost portion may be used as a dummy pixel, and the other pixels may be used as display pixels PX to display an image.

Based on the results of FIGS. 12 and 13, one pixel column/row at the outermost portion of a liquid crystal display in which a color filter or black matrix is disposed under a microcavity may be formed as dummy pixels.

Figure 14:
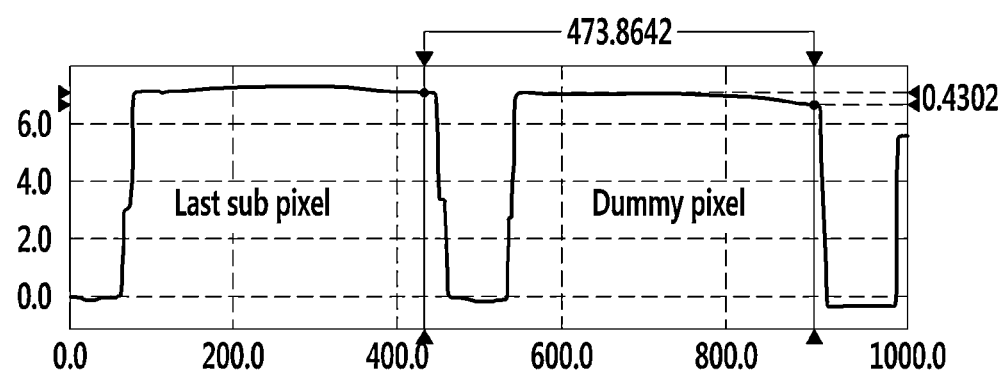
FIG. 14 illustrates the characteristic of the peripheral portion of the liquid crystal display according to the exemplary embodiment of the present invention.

FIG. 14 illustrates a thickness difference between sacrificial layers of a dummy pixel and a display pixel PX in an exemplary embodiment having dummy pixels.

FIG. 14 illustrates the characteristic of the peripheral portion of the liquid crystal display according to the exemplary embodiment of the present invention.

In FIG. 14, one outermost pixel is used as a dummy pixel, the thickness of a sacrificial layer in the dummy pixel has a thickness difference of 0.4302 μm as compared to the display pixel. The thickness difference may be caused by an ununiform thickness of the microcavity. Thus, a cell gap of the liquid crystal layer 3 may differ in the outmost pixel. Thus, the outermost pixel may be formed and used as a dummy pixel.

Implementation of the dummy pixel depends on the thickness variation of the sacrificial layer. However, when a color filter or black matrix is disposed under a microcavity (or liquid crystal layer) in a liquid crystal display, one or more outermost pixels may be used as dummy pixels, in order to realize a more desirable display quality.

Hereinafter, a dummy pixel having a different structure will be described with reference to FIG. 15.

Figure 15:
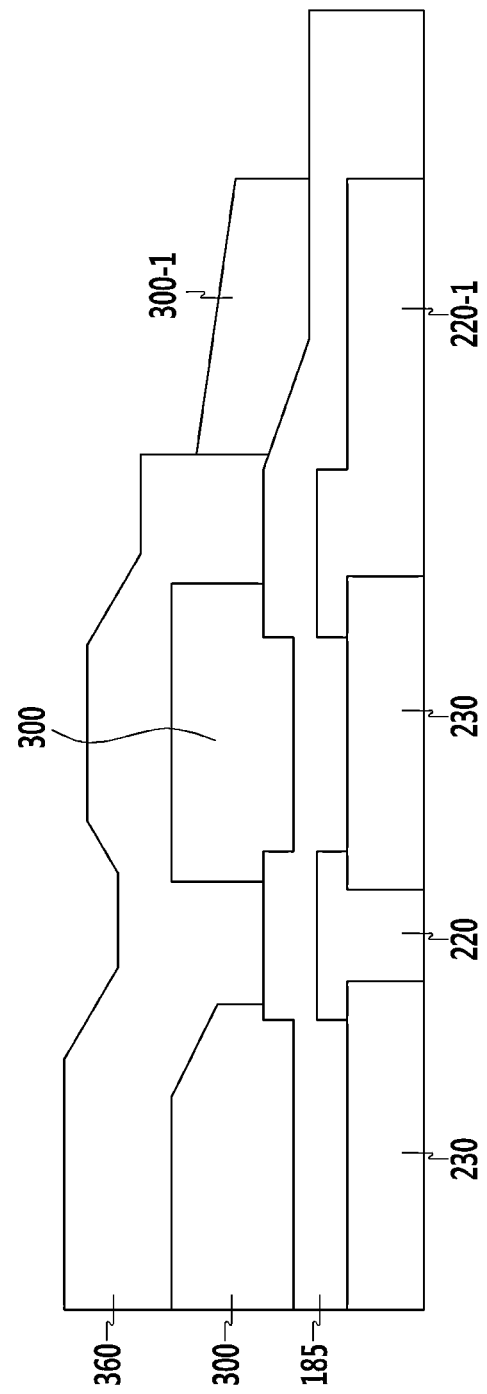
FIG. 15 illustrates a cross-sectional structure of a peripheral portion of a liquid crystal display according to another embodiment of the present invention.

FIG. 15 illustrates a cross-sectional structure of a peripheral portion of a liquid crystal display according to another embodiment of the present invention.

The dummy pixel illustrated in FIG. 15 has a portion 220-1 extends from an end of a black matrix 220 (hereinafter, referred to as extension), unlike the structure illustrated in FIG. 6. The extension 220-1 serves to prevent light from being transmitted to the bottom of a sacrificial layer 300-1 and is formed of the same material as the black matrix 220.

In FIG. 15, the sacrificial layer 300-1 is not covered by a roof layer 360. The top of the sacrificial layer 300-1 may be covered by a layer such as an upper insulating layer.

The structure of the dummy pixel illustrated in FIG. 15 may have the following structure.

The dummy pixel includes a thin film transistor connected to a gate line (dummy gate line) and a data line (dummy data line), a first passivation layer 180 covering the thin film transistor, an extension 220-1 of a black matrix formed over the first passivation layer, a second passivation layer 185 covering the extension 220-1, a pixel electrode disposed over the second passivation layer 185, and a sacrificial layer 300-1 disposed over the pixel electrode. In FIG. 15, a part of the components may be omitted. Depending on exemplary embodiment, however, the dummy pixel may have a different structure. The dummy pixel may further include a common electrode 270, and an upper insulation layer 370 may cover the sacrificial layer 300-1. Depending on exemplary embodiments, the sacrificial layer 300-1 may be removed.

Hereinafter, a drooping which occurs at peripheral portions of various liquid crystal displays will be examined with reference to FIG. 16. Hereinafter, a drooping means not maintaining a required height in any layer. Implementation of the dummy pixel and number of dummy pixel layers may depend on the drooping.

FIG. 16 is a table showing characteristics of peripheral portions of liquid crystal displays according to various embodiments of the present invention.

FIG. 16 shows the characteristics of four liquid crystal displays. COA represents a case in which a color filter and a black matrix are disposed under a microcavity (or liquid crystal layer). In only a fourth comparative example, a color filter and a black matrix are not disposed under a microcavity, but disposed over the microcavity. Referring to FIG. 16, it can be seen that when the color filter is disposed over the microcavity, a bottom level difference of the microcavity or a drooping of the outermost pixel decreases.

Among first to third comparative examples in which the color filter and the black matrix are disposed under the microcavity (or liquid crystal layer), a bottom level difference or a drooping of the outermost pixel in the structure including the extension 220-1 of the black matrix of FIG. 15 is smaller than in the other structures. The passivation layers in the second and third comparative examples are an inorganic layer and organic layer, respectively, but the difference does not substantially have an effect on the outermost pixel drooping. However, a level difference may be reduced due to the planarization characteristic of the organic layer in the third comparative examples.

Thus, implementation of the dummy pixel and number of dummy pixel layers may depend on the structure of the liquid crystal display.

In FIG. 16, the first to third comparative examples need dummy pixels, and one or more columns or rows of dummy pixels may be used in the first comparative example.

The fourth comparative example may not require dummy pixels.

As described above, all the liquid crystal displays which have the liquid crystal layer injected into the microcavity may not require dummy pixels. However, when a color filter or black matrix is disposed under a microcavity (or liquid crystal layer), the thickness of a sacrificial layer or roof layer formed at the outermost portion may not have a predetermined thickness, but may have a thickness thinner than the predetermined thickness. Thus, the outermost pixel may be used as a dummy pixel so as not to display an image.

When the thickness of the sacrificial layer or roof layer is not constantly maintained at the outermost portion even though the color filter or black matrix is not under the microcavity, dummy pixels may be required.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
an insulating substrate;
a plurality of pixels arranged in a matrix shape over the insulating substrate,
a roof layer overlapping the insulating substrate; and
a liquid crystal layer comprising liquid crystal molecules disposed in microcavities between the insulating substrate and the roof layer,
wherein the plurality of pixels comprise display pixels disposed in a display region and dummy pixels disposed in a dummy region;
the dummy region is disposed outside the display region, and
the roof layer comprises a pillar portion disposed between adjacent microcavities of the microcavities in the display region.

2. The liquid crystal layer of claim 1, wherein:
the dummy region comprises at least one of
a horizontal dummy region disposed at the top and bottom sides of the display region;
a vertical dummy region disposed at the left and right side of the display region; and
a corner dummy region disposed at a corner of the display region.

3. The liquid crystal layer of claim 2, wherein:
the horizontal dummy region comprises a plurality of dummy pixels arranged in one row, and
the vertical dummy region comprises a plurality of dummy pixels arranged in one column.

4. The liquid crystal layer of claim 3, wherein:
the horizontal dummy region comprises one row of dummy pixels, and
the vertical dummy region comprises one column of dummy pixels.

5. The liquid crystal layer of claim 2, wherein:
the corner dummy region is formed at a position where the horizontal dummy region and the vertical dummy region are extended to meet each other.

6. The liquid crystal layer of claim 2, wherein:
the display pixel comprises:
a thin film transistor;
a pixel electrode connected to the thin film transistor and disposed between the insulating substrate and the microcavity; and
a common electrode disposed over the microcavity.

7. The liquid crystal layer of claim 6, wherein:
the dummy pixel does not comprise at least one of the thin film transistor, the pixel electrode, and the common electrode, which are comprised in the display pixel.

8. The liquid crystal layer of claim 7, wherein:
the display pixel and the dummy pixel have a liquid crystal injection hole for injecting a liquid crystal material into the microcavity.

9. The liquid crystal layer of claim 7, wherein:
the dummy pixel further comprises an organic layer disposed over the pixel electrode or the thin film transistor and made of photoresist.

10. The liquid crystal layer of claim 6, wherein:
the display pixel and the dummy pixel further comprise
a color filter disposed between the thin film transistor and the pixel electrode.

11. The liquid crystal layer of claim 6, wherein:
the display pixel and the dummy pixel further comprise
a black matrix disposed between the thin film transistor and the pixel electrode.

12. The liquid crystal layer of claim 11, wherein:
the black matrix in the dummy region further comprises an extension facing a peripheral portion, and
the extension overlaps the organic layer.

13. The liquid crystal layer of claim 6, wherein:
the dummy pixel does not comprise at least one of the thin film transistor, the pixel electrode, the common electrode, and the roof layer, which are comprised in the display pixel.

14. The liquid crystal layer of claim 13, wherein:
the dummy pixel further comprises an organic layer disposed over the pixel electrode or the thin film transistor and made of photoresist.

15. The liquid crystal layer of claim 14, wherein:
the organic layer of the dummy pixel is exposed because the dummy pixel does not comprise the roof layer.

* * * * *